H. KLIPSTEIN.
AUXILIARY AIR VALVE FOR ENGINES.
APPLICATION FILED JAN. 13, 1917.
1,325,791. Patented Dec. 23, 1919.
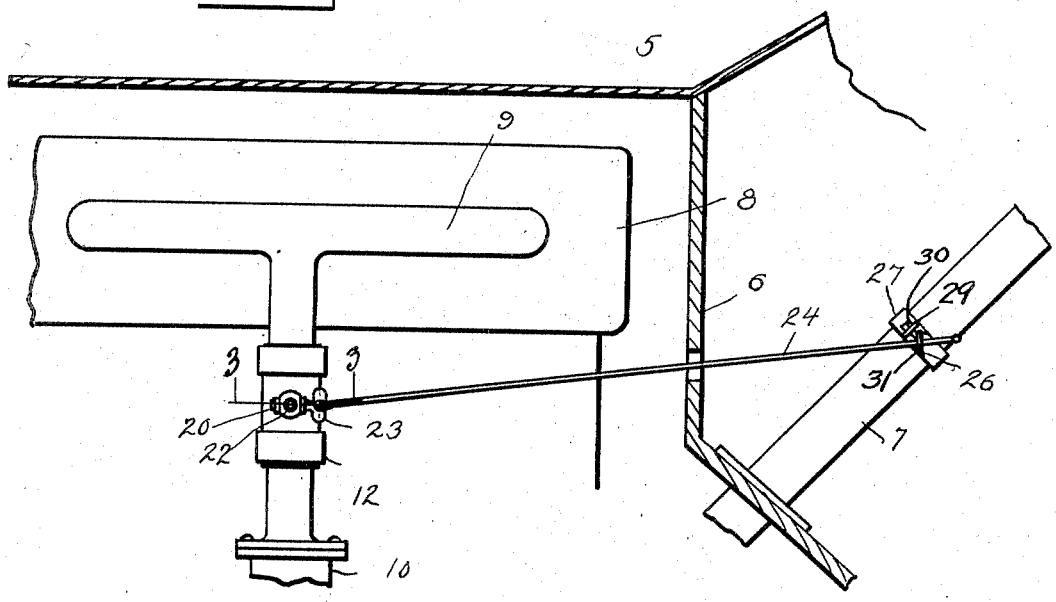
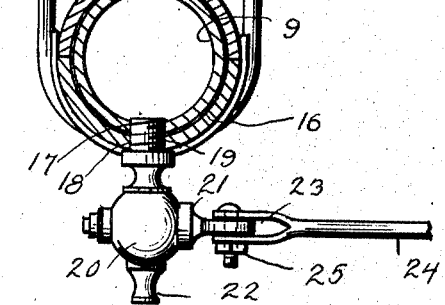
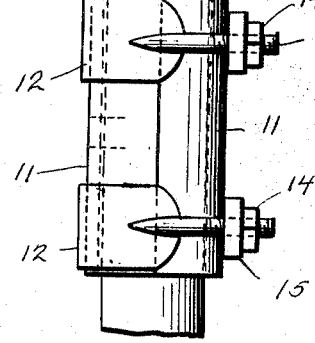
Inventor
H. Klipstein

UNITED STATES PATENT OFFICE.

HERMAN KLIPSTEIN, OF GROTON, SOUTH DAKOTA.

AUXILIARY AIR-VALVE FOR ENGINES.

1,325,791.

Specification of Letters Patent.

Patented Dec. 23, 1919.

Application filed January 13, 1917. Serial No. 142,155.

*To all whom it may concern:*

Be it known that I, HERMAN KLIPSTEIN, citizen of the United States, residing at Groton, in the county of Brown and State of South Dakota, have invented certain new and useful Improvements in Auxiliary Air-Valves for Engines; and I do hereby declare the following to be a full, clear, and exact description of the invention, such as will enable others skilled in the art to which it appertains to make and use the same.

This invention has for its object to provide an improved type of auxiliary air valve for explosive engines, which may be conveniently and inexpensively applied to the fuel inlet manifold of substantially any type of explosive engine, and which may be conveniently adjusted to admit an additional supply of air when the engine is running at high speed.

Another object is the provision of means for attaching the valve to the manifold which will eliminate undue strain upon the latter.

With these and other objects in view, the invention consists in the novel construction, combination and arrangement of parts as will be hereinafter specifically described, claimed and illustrated in the accompanying drawing, in which:

Figure 1 represents a fragmentary sectional view through a motor vehicle, illustrating the auxiliary air valve applied to the inlet manifold of the engine, Fig. 2 represents a fragmentary side elevation taken at right angles to Fig. 1, the air valve being removed, Fig. 3 represents a transverse sectional view on the line 3—3 of Fig. 1, and Fig. 4 represents a transverse sectional view through the steering post of the motor vehicle.

Referring to the drawing in detail, wherein similar reference numerals designate corresponding parts throughout the several views, the numeral 5 indicates generally a motor vehicle having the usual dash 6 and steering post casing 7. The engine 8 of the vehicle is provided with the usual fuel inlet manifold 9 which is connected with a preferred type of carbureter, a fragment of which is illustrated in Fig. 1 and designated by the numeral 10.

The improved auxiliary air valve is attached to the vertical portion of the inlet manifold 9 by a split sleeve 11 formed of two substantially semicylindrical members which embrace the vertical portion of the manifold 9 and are secured in position thereon by substantially U-shaped clips 12, having screw threaded terminals 13 upon which are threaded nuts 14, engaging and clamping the straps 15 against the sleeve part 11. A packing 16 formed of suitable flexible material is interposed between the parts of the split sleeve 11 and the vertical portion of the manifold 9 to insure against leakage of air into the manifold during operation of the engine.

The vertical portion of the manifold 9 and the front sleeve part 11 are formed with registering openings 17 and 18, respectively, in which is threaded the externally screw threaded outlet terminal 19 of the auxiliary air valve casing 20, receiving the rotatable valve 21. The valve 21 is formed with the usual diametrical port controlling the passage of air from the inlet terminal 22 of the casing to the outlet terminal 19 thereof, and the rear terminal of the valve 21 is provided with a finger piece or stem 23.

A rod 24 is pivotally connected at 25 to the stem 23 of the valve and extends rearwardly through the dash 6 and is supported at its rear terminal by a clip or split collar 27. The clip 27 includes the circular portion 28 arranged to embrace the steering post having the outwardly extending ears 29 formed on the terminals thereof. A bolt 30 extends through the ears and adjustably holds the clip 27 in the desired position. One of said ears 29 is provided with an extension 31 which is provided with a plurality of apertures 26 for receiving the rod 24. The rod 24 may be positioned in any one of the apertures 26 desired so that the same may be placed in the desired position.

What I claim is:

The combination with a motor vehicle including a dash, an explosive engine, a steering post, and a fuel inlet manifold for the engine, of an auxiliary air valve supported by the fuel inlet manifold, a split collar arranged on the steering post and having outwardly extending ears formed thereon, means extending through the ears to adjustably hold the collar in position, one of said ears having an outwardly extending extension formed thereon, said extension being bent at an angle to the other ear and collar and having a pair of spaced apertures therein, and an operating rod secured to the auxiliary air valve and arranged to be rotatably mounted in either of the apertures in the ear, as and for the purpose specified.

In testimony whereof I affix my signature in presence of two witnesses.

HERMAN KLIPSTEIN.

Witnesses:
R. A. MATHER,
CHAS. E. ADAMS.